(12) United States Patent
Inagaki et al.

(10) Patent No.: US 7,107,389 B2
(45) Date of Patent: Sep. 12, 2006

(54) SEMICONDUCTOR MEMORY DEVICE AND METHOD FOR WRITING DATA INTO FLASH MEMORY

(75) Inventors: Yoshihisa Inagaki, Neyagawa (JP); Toshiyuki Honda, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 347 days.

(21) Appl. No.: 10/486,960

(22) PCT Filed: Aug. 25, 2003

(86) PCT No.: PCT/JP03/10718

§ 371 (c)(1),
(2), (4) Date: Feb. 13, 2004

(87) PCT Pub. No.: WO2004/021191

PCT Pub. Date: Mar. 11, 2004

(65) Prior Publication Data
US 2004/0193786 A1    Sep. 30, 2004

(30) Foreign Application Priority Data
Aug. 29, 2002    (JP)    ............................. 2002-251194

(51) Int. Cl.
*G06F 12/00*    (2006.01)
(52) U.S. Cl. ................. 711/103; 365/185.01
(58) Field of Classification Search ................. 711/103; 365/185.01
See application file for complete search history.

(56) References Cited

U.S. PATENT DOCUMENTS 5,611,067 A * 3/1997 Okamoto et al. ........... 711/103
6,141,726 A * 10/2000 Dell ........................... 711/103
6,763,424 B1 * 7/2004 Conley ....................... 711/103
6,938,116 B1 * 8/2005 Kim et al. .................. 711/103

FOREIGN PATENT DOCUMENTS

JP    09282111 A    10/1997

* cited by examiner

*Primary Examiner*—Woo H. Choi
(74) *Attorney, Agent, or Firm*—Akin Gump Strauss Hauer & Feld, LLP

(57) ABSTRACT

A source block (B0) and the logical page number ("8") of a write target page are identified from the logical address of the write target page. Data objects (DN8, DN9, ..., DN12) to be written, which a host stores in a page buffer (2), are written into the data areas (DA) of the pages (Q0, Q1, ..., Q4) of a destination block (Bn), starting from the top page (Q0) in sequence. The logical page number ("8") of the write target page is written into the redundant area (RA) of the top page (Q0). The physical page number ("6=8−2") of the write target page is identified, based on the logical page number ("8") of the write target page and the page offset ("2") of the source block (B0). When notified by the host of the end of the sending of the data objects (DN8, ..., DN12), the data items (D13, ..., D31, D0, D1, ..., D7) in the source block (B0) are transferred to the pages (Q5, Q6, ..., Q31) in the destination block (Bn) via the page buffer (2) sequentially and cyclically, starting from the page (P11) situated cyclically behind the write target page (P6) by the number ("5") of pages of the data objects (DN8, ..., DN12).

8 Claims, 9 Drawing Sheets

SEMICONDUCTOR MEMORY DEVICE AND METHOD FOR WRITING DATA INTO FLASH MEMORY

CROSS-REFERENCE TO RELATED APPLICATIONS

This application is a section 371 of International Application No. PCT/JP03/10718, filed Aug. 25, 2003, the disclosure of which is incorporated herein by reference.

The present invention relates to a semiconductor memory apparatus that includes a flash memory device. In particular, the invention relates to a method of writing data into the flash memory device.

BACKGROUND ART

Information processing appliances and, further in recent years, household electric appliances, such as television sets and refrigerators, include CPUs and realize advanced operating control by software. The appliances store (firmware) programs for the operating control and parameters in ROMs. Semiconductor memory apparatuses that include flash memory devices are extensively used as the ROMs. In addition, the semiconductor memory apparatuses are extensively used in portable information processing appliances (mobile appliances), such as notebook computers, personal digital assistants (PDA), digital cameras, portable audio players, and cellular phones, as external, miniature recording media like memory cards. Especially for the uses, it is desirable that the semiconductor memory apparatuses have large capacities and small sizes.

The storage area of a flash memory device is generally divided into a plurality of pages each having a fixed number of memory cells. Writing and reading of data are performed page by page. The storage area is further divided into a plurality of blocks each having a fixed number of the pages. A data erasing is performed collectively in each of the blocks. Accordingly, page-by-page overwriting of data cannot be performed in the strict sense in the flash memory device, in contrast to RAMs.

A conventional semiconductor memory apparatus realizes a renewal of data stored in some pages of flash memory devices (which is hereafter referred to as a renewal of pages) and a writing of new data onto blank pages (which is hereafter referred to as an addition of pages), for example, as follows. FIG. 9 is an illustration of the renewal or addition of pages in one block of a flash memory 1 by the conventional semiconductor memory apparatus.

The conventional semiconductor memory apparatus comprises the flash memory 1 and two RAMs; a saving buffer 20 and a page buffer 2. The flash memory 1 is divided into more than one block B0, B1, . . . A physical address is allocated to each of the blocks B0, B1, . . . Each of the blocks includes 32 pages. For example, the head block (or the first block) B0 includes pages P0, P1, . . . , and P31, and the (n+1)th block Bn ($n \geq 1$) includes pages Q0, Q1, . . . , and Q31. A page in the block is identified by the pair of the physical address of the block and a page number in the block. The page numbers are, for example, serial numbers 0–31 put on the respective pages of the block from its top page in sequence. The saving buffer 20 and the page buffer 2 each have a storage capacity substantially equal to that of one page of the flash memory 1.

A host sends out a logical address designating a write target page and data objects to be written, to the semiconductor memory apparatus. The semiconductor memory apparatus stores the data objects DN in the page buffer 2. On the other hand, the semiconductor memory apparatus identifies the corresponding page in the flash memory 1 from the logical address. For example, when the logical address designates the (p+1)th page Pp ($0 \leq p \leq 31$) of the head block B0, the semiconductor memory apparatus converts the logical address into the pair of the physical address of the head block B0 and the page number p of the (p+1)th page Pp. The physical address is identified as the physical address of a block being a source of data transfer (which is hereafter referred to as a source block). Then, the semiconductor memory apparatus selects, in the flash memory 1, one block in which data has not yet been written (which is hereafter referred to as a blank block). The semiconductor memory apparatus selects, for example, the (n+1)th block Bn being the blank block. The physical address of the (n+1)th block Bn is identified as a physical address of the block to which the data stored in the source block B0 is transferred (which is hereafter referred to as a destination block).

The conventional semiconductor memory apparatus transfers data items stored in the source block B0 to the destination block Bn as follows. First, the data item D0 of the top page P0 of the source block B0 is read into the saving buffer 20 (see the arrow R0 shown in FIG. 9.) Next, the data item D0 of the saving buffer 20 is written onto the top page Q0 of the destination block Bn (see the arrow W0 shown in FIG. 9.) Then, the data item D1 of the second page P1 of the source block B0 is read into the saving buffer 20 (see the arrow R1 shown in FIG. 9.) Next, the data item D1 of the saving buffer 20 is written onto the second page Q1 of the destination block Bn (see the arrow W1 shown in FIG. 9.) Such a data transfer via the saving buffer 20 is repeated the same number of times as the page number p of the write target page (the (p+1)th page Pp of the source block B0) (=p times). When the write target page (the (p+1)th page) Pp of the source block B0 is set as the source page of data reading, the semiconductor memory apparatus skips the data transfer to the saving buffer 20 for the page. Instead, the data object DN to be written, which is stored in the page buffer 2, is written onto the (p+1)th page Qp of the destination block Bn (see the arrow Wp shown in FIG. 9.) The data transfer via the saving buffer 20 is again repeated from the page next to the write target page Pp (the (p+2)th page) of the source block B0. The data item D31 of the bottom page P31 of the source block B0 is written onto the bottom page Q31 of the destination block Bn via the saving buffer 20 (see the arrows R31 and W31 shown in FIG. 9.) The semiconductor memory apparatus brings the logical address corresponding to the physical address of the source block B0 into correspondence with the physical address of the destination block Bn. The data item on the (p+1)th page Pp having the page number p is rewritten in the destination block Bn, in contrast to the source block B0. Thus, the conventional semiconductor memory apparatus realizes the renewal and addition of pages for one block of the flash memory 1.

Semiconductor memory apparatuses are required to have large capacities and small sizes as far as possible. However, improvements in packing density of the flash memory devices are not easy. Accordingly, size reductions of circuit parts except the flash memory devices are desirable. For example, when many functional sections each include common circuit parts, the common parts are to be integrated into a single part. Thereby, reductions in number of the common parts are desirable. Size reductions of the semiconductor memory apparatuses are more desirable since they reduce the costs of manufacturing through the reductions in area of chips. The conventional semiconductor memory apparatus has the two RAMs, the saving buffer and the page buffer, as described above. The RAMs share the commonalities, being used as a buffer memory and having the substantially same storage capacity as that of one page of the flash memory device. Accordingly, the integration of the saving buffer and the page buffer into one RAM is strongly desirable. In the renewal of pages by the conventional semiconductor memory apparatus, however, the page buffer has to hold data objects to be written until the write target page is set as a target of saving, as described above. Therefore, it is difficult that the page buffer doubles as the saving buffer.

DISCLOSURE OF INVENTION

An object of the present invention is to provide a semiconductor memory apparatus wherein the size of RAM is reduced through the integration of the saving buffer and the page buffer into a single RAM, and thereby miniaturization is achieved.

A semiconductor memory apparatus according to the present invention comprises:

(A) a flash memory device comprising more than one block, each of which includes more than one page, and a page-offset storage area in which a page offset of each of the blocks is stored, and writing data into a blank block from its top page in sequence;

(B) a page buffer in which the substantially same amount of data as the data storage capacity of one of the pages is temporarily stored;

(C) an address conversion section for receiving from a host a logical address that specifies a write target page, and converting the logical address into a pair of a physical address of the block (which is hereafter referred to as a source block) to which the write target page belongs, and a logical page number of the write target page; and (D) a memory control section for (a) reading the physical address of the source block and the logical page number of the write target page, (b) selecting one of the blank blocks as a destination block, (c) determining a page offset of the destination block based on the logical page number of the write target page, and writing the page offset into the page-offset storage area as the page offset of the destination block, (d) reading a page offset of the source block from the page-offset storage area, (e) obtaining a physical page number of the write target page based on the page offset of the source block and the logical page number of the write target page, (f) writing a data object to be written, which is transferred from the host to the page buffer, into the destination block from its top page in sequence, (g) obtaining a physical page number of a transfer start page of the source block based on the number of pages of the data objects and the physical page number of the write target page, and (h) transferring data stored in the source block, from the transfer start page in a sequential and cyclic manner, via the page buffer, to a page next to or after a page area of the destination block into which the data object is written.

The logical page numbers are serial numbers allocated to the respective pages in the flash memory device by the host. The physical page numbers are serial numbers put on the respective pages of each block in the flash memory device, from the top page in sequence. The page offset of a block means a cyclic deviation of the logical page order from the physical page order in the block. The page offset of the block is preferably the same as the logical page number of the top page of the block. The above-described semiconductor memory apparatus according to the present invention stores the page offsets of the respective blocks in the flash memory device. Here, the actually stored data items may be the logical page numbers of particular pages, in addition to the page offsets themselves. The page offset storage areas are preferably the redundant areas of the top pages of the respective blocks. The redundant area of the page is the storage area accessible independently of the data area of the page. For example, the logical address corresponding to the page, the flag showing whether or not the page is a blank page, the flag showing that the data written onto the page is enabled/disabled (in other words, the access of the host to the page is allowed/inhibited), and the error-detecting code (e.g. CRC) of the data, are stored in the redundant area of the page. The storage space for the page offsets may be allocated to a non-volatile memory separated from the above-described flash memory device (which is hereafter referred to as a page-offset storage section), in addition to the page-offset storage area in the flash memory device. The page-offset storage section is included, for example, in the memory control section. The page buffer is a RAM, and preferably, an SRAM. The number of pages of the data objects to be written means the amount of the data objects expressed in the unit that is the data storage capacity per page in the flash memory device. The number of pages of the data objects is equal to the number of pages of the page area of the destination block into which the data objects are written.

In the above-described semiconductor memory apparatus according to the present invention, the logical page numbers of the pages in the flash memory device may shift from the physical page numbers of the pages in a cyclic manner in the respective blocks. The physical page number of each page is calculated based on the logical page number of the page and the page offset of the block to which the page belongs. When receiving from the host the instruction for a renewal of some pages or an addition of new pages in a block, the above-described semiconductor memory apparatus according to the present invention first writes the data objects to be written, which are transferred from the host to the page buffer, into the destination block, from its top page in sequence. Thereby, the page buffer is freed before the start of the saving process for the source block. Accordingly, the above-described semiconductor memory apparatus according to the present invention can use the page buffer as a saving buffer at the saving of the source block. As a result, the above-described semiconductor memory apparatus according to the present invention has RAMs smaller in size than those of conventional apparatuses. Therefore, the above-described semiconductor memory apparatus according to the present invention has the whole size smaller than that of the conventional apparatus when the sizes of the flash memory devices are fixed.

The above-described semiconductor memory apparatus according to the present invention may further comprise: (a) a host interface for receiving the logical address of the write target page and the data object, which are sent out from the host; and (b) an address-conversion-table storage section storing a logical/physical address conversion table showing a correspondence between a logical address and a physical address for each of the blocks in the flash memory device, and a flag for showing whether or not each of the blocks is the blank block; and the above-described memory control section may count the number of pages of the data objects and may start data transmission from the source block to the destination block, when the number of the pages reaches a predetermined number, or when the host provides notification of the end of sending of the data object. Here, the address-conversion-table storage section is preferably a RAM. The logical/physical address conversion table is the table showing the correspondences between the logical address allocated to each block in the flash memory device and the physical address of the block.

Since the host interface is independent of the memory control section, data communications between the host and the semiconductor memory apparatus are performed independently of data writing/reading in the flash memory device. Thereby, for example, the latency time of the host for writing data into the flash memory device is shortened.

The address conversion section scans, for example, the redundant areas of the pages in the flash memory device. Thereby, the logical addresses of the respective blocks in the flash memory device are listed. Thus, the address conversion section creates the logical/physical address conversion table, and stores the table into the address-conversion-table storage section. The address conversion section consults the logical/physical address conversion table, when converting the logical address of the write target page into the pair of the physical address of the source block and the logical page number of the write target page. Thereby, the section can promptly retrieve the physical address corresponding to the logical address.

The address conversion section further checks whether or not each block is a blank block, based on the data items stored in the scanned redundant areas. Thereby, the section determines the above-described flags for the respective blocks, and stores the flags into the address-conversion-table storage section. The memory control section consults the above-described flags, when selecting one of the blank blocks as a destination block. Thereby, the section can promptly determine the destination block.

For example, when transferring the data objects to be written, which the host stores in the page buffer, from the page buffer to the destination block, the memory control section counts the number of times of the transfer. The host may notify the semiconductor memory apparatus of the end of sending of the data objects, for example, using a predetermined command. In that case, the memory control section can detect the number of pages of the data objects from the above-described number of times of the transfer at the receipt of the notification. At the same time, the memory control section starts the data transfer from the source block to the destination block. Alternatively, the host may notify the semiconductor memory apparatus of the number of pages of the data objects before sending the data objects. In that case, the memory control section starts the data transfer from the source block to the destination block when the above-described number of times of the transfer reaches the notified number of pages.

A method of writing data into a flash memory device, which is the method of writing data into a flash memory device comprising more than one block, each of which includes more than one page, and writing data into a blank block from its top page in sequence;

the method comprising the steps of:

(A) receiving from a host a logical address specifying a write target page;

(B) converting the logical address into a pair of a physical address of a source block and a logical page number of the write target page;

(C) selecting one of the blank blocks as a destination block;

(D) determining a page offset of the destination block based on the logical page number of the write target page, and writing the page offset into a page-offset storage area in the flash memory device as a page offset of the destination block;

(E) reading the page offset of the source block from the page-offset storage area;

(F) determining a physical page number of the write target page based on the page offset of the source block and the logical page number of the write target page;

(G) writing a data object to be written, which is transferred from the host to a page buffer, into the destination block from its top page in sequence; and (H) obtaining a physical page number of a transfer start page of the source block based on the number of pages of the data objects and the physical page number of the write target page, and transferring data stored in the source block, from the transfer start page in a sequential and cyclic manner, via the page buffer, to a page next to or after a page area of the destination block into which the data object is written. Here, the logical page number, the physical page number, the page offset of the block, the page-offset storage area (or the page-offset storage section), the page buffer, and the number of pages of the data objects to be written are defined in a manner similar to the above-described ones.

In the above-described method of writing data according to the present invention, the logical page numbers of the pages in the flash memory device may shift from the physical page numbers of the pages in a cyclic manner in the respective blocks. The physical page number of each page is calculated based on the logical page number of the page and the page offset of the block to which the page belongs. When the host provides the instruction for a renewal of some pages or an addition of new pages in a block, the data objects to be written, which are transferred from the host to the page buffer, are first written into the destination block, from its top page in sequence. Thereby, the page buffer is freed before the start of the saving process for the source block. Accordingly, the page buffer can double as a saving buffer at the saving of the source block. As a result, a RAM size required in the above-described method of writing data is smaller than that of the conventional method. Therefore, a semiconductor memory apparatus has the whole size smaller than that of the conventional apparatus when the sizes of the flash memory devices are fixed.

The method of writing data according to the present invention may further comprise the step of counting the number of pages of the page area of the destination block, into which the data objects are written, and starting data transmission from the source block to the destination block, when the number of the pages reaches a predetermined number, or when the host provides notification of the end of sending of the data object. For example, every time when the data object is transferred from the page buffer to the destination block, the number of times of the transfer is counted. The host may notify the semiconductor memory apparatus of the end of sending of the data object, for example, using a predetermined command. In that case, the number of pages of the above-described page area is detected from the above-described number of times of the transfer at the receipt of the notification. In addition, the data transfer from the source block to the destination block gets started at the notification. Alternatively, the host may notify the semiconductor memory apparatus of the number of pages of the data objects before sending the data objects. In that case, the data transfer from the source block to the destination block starts when the above-described number of times of the transfer reaches the notified number of pages.

The page buffer is freed before the start of the saving process for the source block in the above-described semiconductor memory apparatus and its method of writing data according to the present invention. Accordingly, the page buffer can double as a saving buffer at the saving process. As a result, the above-described semiconductor memory apparatus has RAMs smaller in size than those of conventional apparatuses. Therefore, the above-described semiconductor memory apparatus according to the present invention has the whole size smaller than that of the conventional apparatus when the sizes of the flash memory devices are fixed. Manufacturing costs of the above-described semiconductor memory apparatus according to the present invention reduce lower than those of the conventional apparatuses, since the chip area is particularly small.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

BEST MODE FOR CARRYING OUT THE INVENTION

The following describes the best embodiment of the present invention, referring to the figures.

Figure 1:
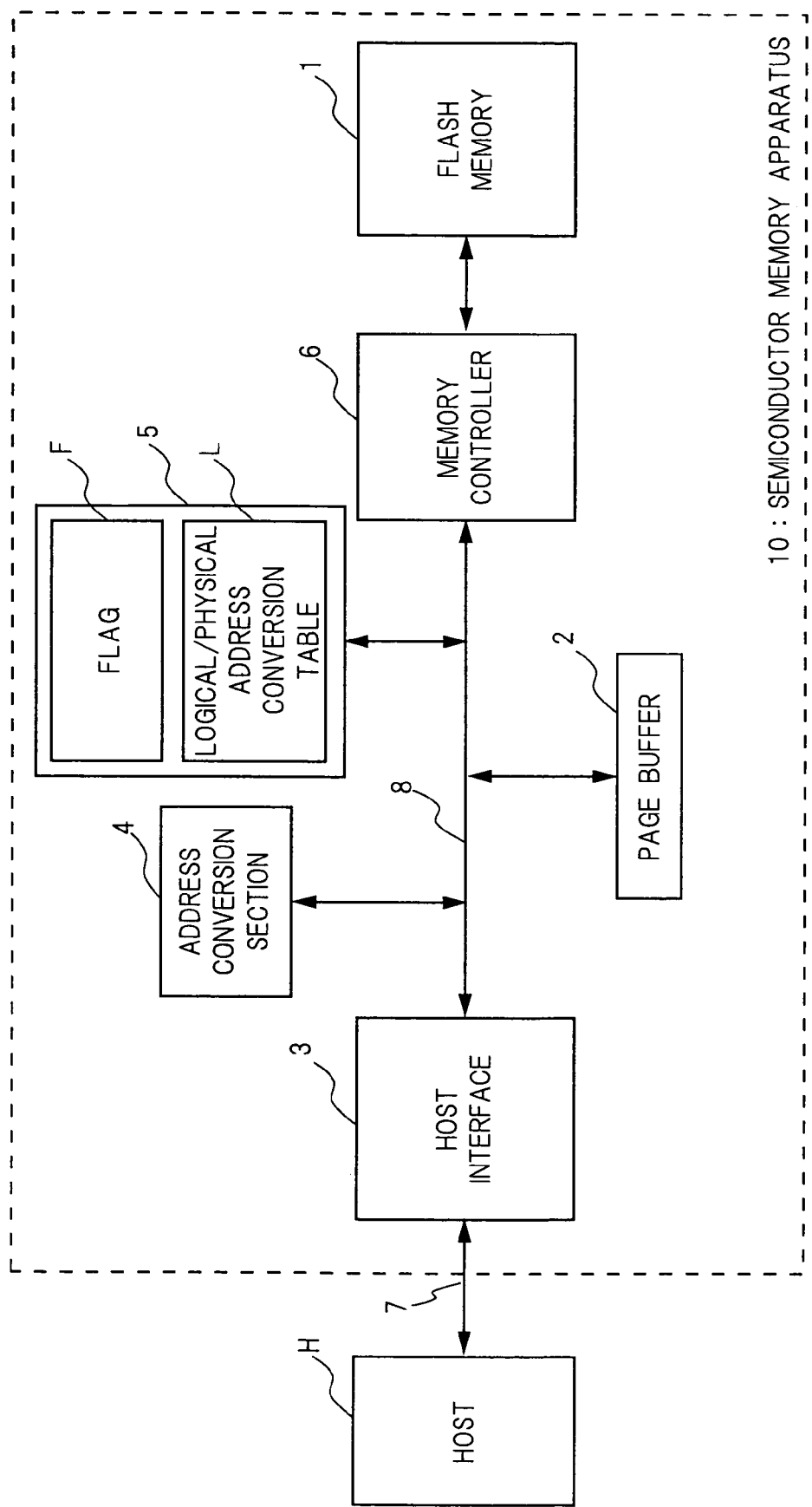
FIG. 1 is a block diagram showing a semiconductor memory apparatus 10 according to an embodiment of the present invention.

FIG. 1 is the block diagram showing the semiconductor memory apparatus 10 according to the embodiment of the present invention. The semiconductor memory apparatus 10 is connected with the host H through an external bus 7. Here, the host H is, for example, an information processing device such as a personal computer, or a mobile appliance such as a PDA and a cellular phone. The semiconductor memory apparatus 10 may be provided for the host H either internally or externally.

Figure 2:
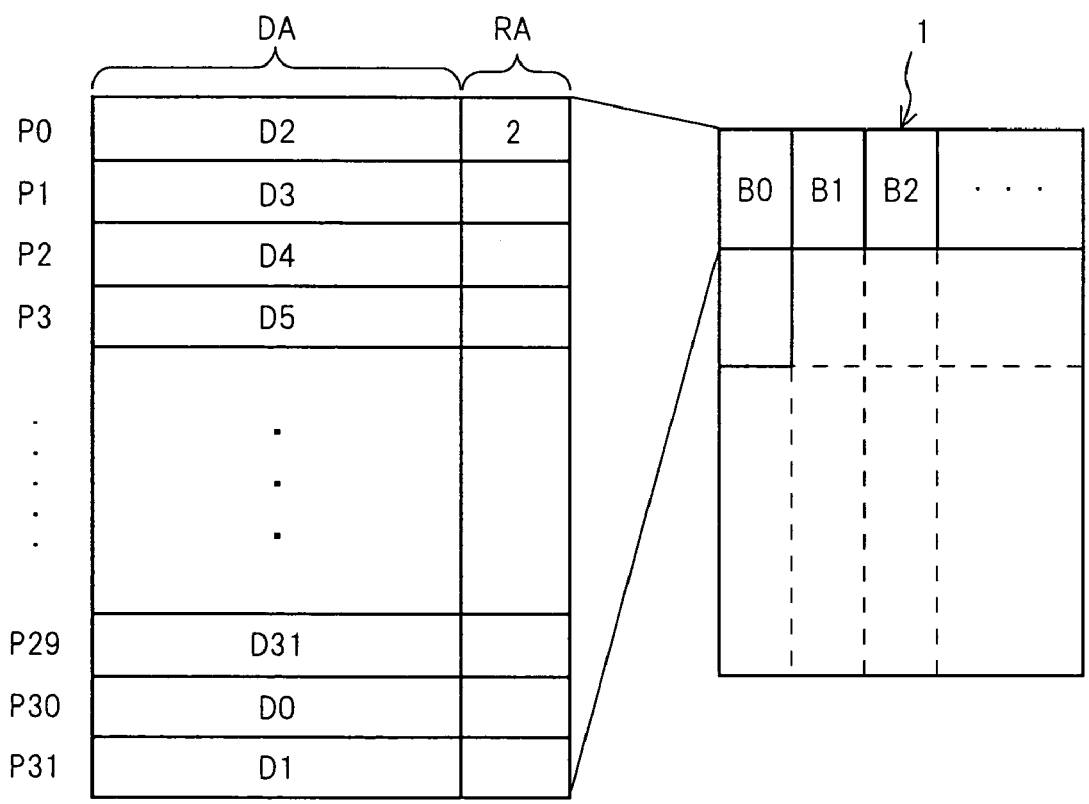
FIG. 2 is a schematic diagram showing the outline of the structure of a cell array in a flash memory 1 according to the embodiment of the present invention.

The flash memory 1 is preferably a NAND-type EEPROM (electrically erasable programmable ROM). FIG. 2 is the schematic diagram showing the outline of the structure of the cell array in the flash memory 1. The cell array is a cluster of many blocks B0, B1, B2, . . . Each block includes 32 pages, for example. The head block B0 includes 32 pages P0–P31, for example. Other blocks B1, B2, . . . , are alike. In the flash memory 1, data items are only collectively erased on a block-by-block basis. Each page includes the two-dimensional arrangement of (512+16)-column×8 memory cells. Here, the eight memory cells are connected in the NAND-type form, constituting one column. Furthermore, 512 columns of the memory cells constitute a data area DA, and the remaining 16 columns of the memory cells constitute a redundant area RA. Data writing and reading are performed page by page, in the flash memory 1. Here, the data area DA and the redundant area RA are independently accessed. One memory cell stores one bit of data, for example. Then, one column of the memory cells stores eight bits=one byte. In the NAND-type EEPROM, the data items stored in one column of the memory cells are sent or received at a time as one word. The data areas DA of the cell array have 512 bytes of storage capacity per one page, or 512 bytes×32=16 kB per one block, as computed from the above-described structure. The redundant area RA stores the attributes of the data items stored in the data area DA of the page to which the redundant area belongs. The redundant area includes, for example, the logical address corresponding to the page to which the redundant area belongs, a flag showing whether or not the page is blank, a flag showing whether the data items written on the page are enabled or disabled (in other words, the access by the host is allowed or inhibited), and/or the error-detecting codes (e.g., CRC) of the data items.

When data streams of one block size or more are stored into the flash memory 1, the data streams are divided into pages and written into the data areas DA of the respective pages, from the top page of the blank block in sequence. In particular, the logical page order in each block may shift from the physical page order in the block in a cyclic manner as follows: In FIG. 2, for example, the top page (the first page) P0, the second page P1, . . . , the 30th page P29, the 31st page P30, and the final page (the 32nd page) P31 of the head block B0 store data items D2, D3, . . . , D31, D0, and D1, respectively. Here, numerical values beside the reference symbol P showing the pages of the head block B0 indicate the physical page numbers of the respective pages. Furthermore, numerical values beside the reference symbol D showing data items stored in the pages P0–P31 indicate the logical page numbers of the respective pages. Then, each logical page number of the pages P0–P31 of the head block B0 shifts from the physical page number by a constant number, "2".

The cyclic deviations between the logical page orders and the physical page orders generally vary among the blocks. This cyclic deviation of a block is referred to as a page offset of the block. The page offset of a block is the same as the logical page number of the top page of the block. In the flash memory 1, the page offsets are represented by integers between 0 and 31 inclusive and stored in page-offset storage areas of the respective blocks. Here, the page-offset storage area is, for example, the redundant area RA of the first page of each block. In FIG. 2, the page offset "2" of the head block B0 is stored in the redundant area RA of the top page P0. In addition, the page offset may be stored in the redundant area RA of one of the pages except the top page. In that case, the stored data item may be the logical page number of the page instead of the page offset itself. The semiconductor memory apparatus 10 can calculate the page offset from the deviation between the logical page number and the physical page number of the page.

A host interface 3 (see FIG. 1) relays data between the external bus 7 and the internal bus 8, and realizes data exchanges between functional sections in the semiconductor memory apparatus 10 and the host H. When receiving from the host H a data read command for the flash memory 1, the host interface 3 decodes the read command and sends the logical address to specify a read target page to the address conversion section 4. The host interface 3 further sends the data objects to be read, which are transferred from the flash memory 1 to the page buffer 2 by the memory controller 6, through the external bus 7 to the host H. When receiving from the host H a data write command for the flash memory 1, the host interface 3 decodes the write command and sends the logical address to specify the write target page to the address conversion section 4. The host interface 3 further transfers the data objects to be written, which are received from the host H, through the internal bus 8 to the page buffer 2.

The page buffer 2 is an SRAM preferably, and temporarily stores the data items exchanged between the host interface 3 and the memory controller 6. The storage capacity of the page buffer 2 is 512 bytes, for example, and substantially the same as the storage capacity of (the data area DA of) one page in the flash memory 1.

The address conversion section 4 receives the logical address from the host interface 3. In the logical address, for example, the upper bits show the logical address of one block in the flash memory 1 (a logical block address), and the lower bits show the logical page number of one page in the block. The address conversion section 4 first divides the logical address input into the logical block address and the logical page number. The address conversion section 4 next accesses an address-conversion-table storage section 5. The address-conversion-table storage section 5 is a RAM preferably, and stores a logical/physical address conversion table L. The address conversion section 4 converts the logical block address into the physical address of the corresponding block, based on the logical/physical address conversion table L. The pair of the physical address and the logical page number is sent to the memory controller 6. Here, the logical/physical address conversion table L is a table bringing a-logical block address allocated to each enabled block in the flash memory 1 into correspondence with the physical address of the block. The address conversion section 4 scans the redundant areas RA of the top pages of blocks of the flash memory 1 at the start up of the semiconductor memory apparatus 10, for example, thereby listing the logical block addresses of the enabled blocks in the flash memory 1. Thus, the logical/physical address conversion table L is created and stored in the address-conversion-table storage section 5.

The address-conversion-table storage section 5 stores, for example, a flag F for each block of the flash memory 1 to show whether or not to be a blank block, in addition to the logical/physical address conversion table L. The address conversion section 4 checks each block in the flash memory 1 for a blank block, based on the data stored in the redundant area RA of the block, and determines the above-described flag F. The address conversion section 4 further stores the flags F into the address-conversion-table storage section 5.

The memory controller 6 identifies one page in the flash memory 1 based on the pair of the physical address and the logical page number, which is received from the address conversion section 4. The memory controller 6 performs data reading/writing for the identified page. For example, at the receipt of a read command from the host H, the memory controller 6 first receives from the address conversion section 4 the physical address that is converted from the destination address of the read command, and identifies a block corresponding to the physical address in the flash memory 1. The memory controller 6 next reads the page offset of the block from the redundant area of the top page of the block. The memory controller 6 identifies the physical page number corresponding to the logical page number, based on the page offset and the logical page number received from the address conversion section 4. The memory controller 6 reads from the flash memory 1 the data item stored on the page having the physical page number, and transfers the data item to the page buffer 2.

Figure 3:
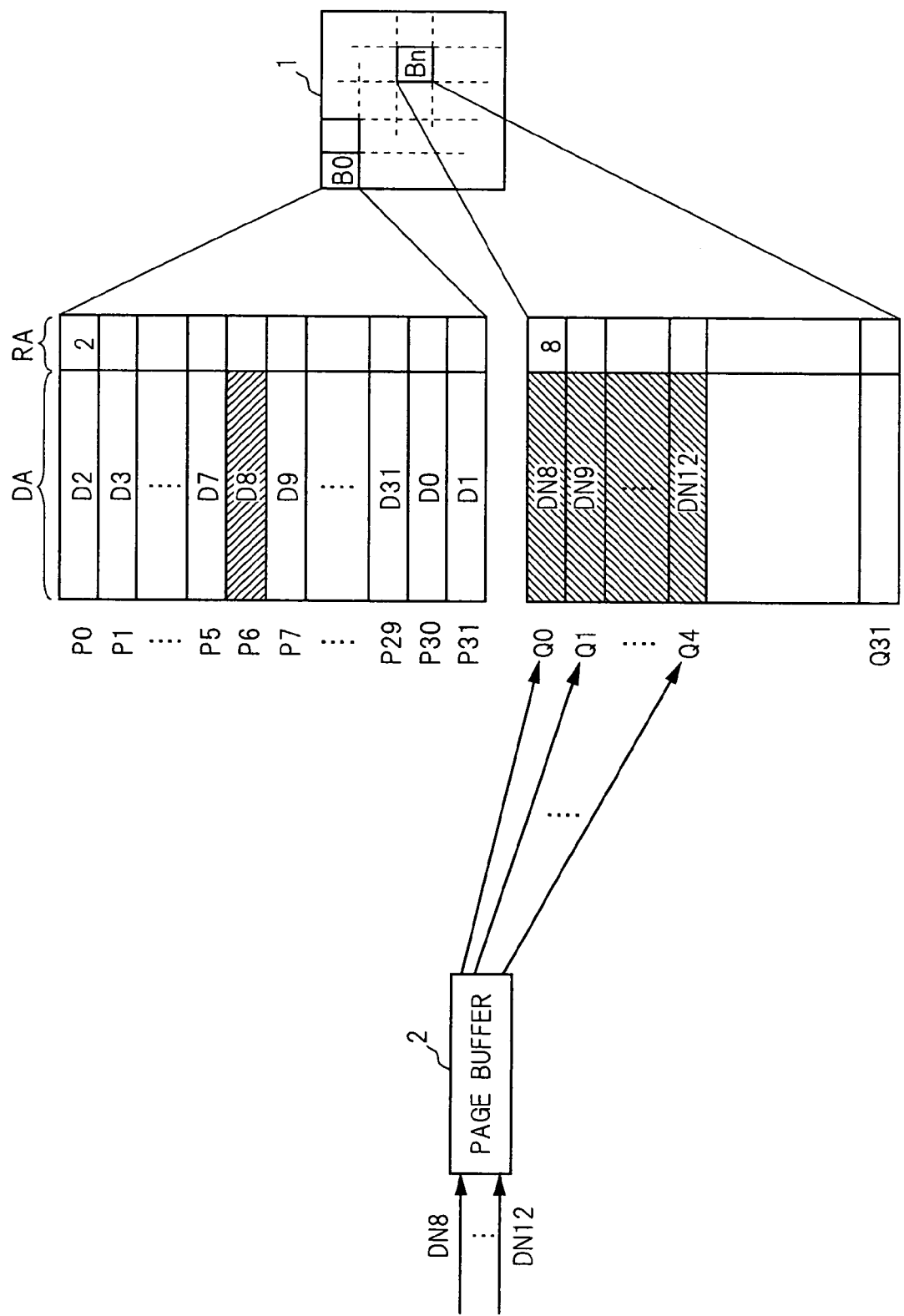
FIG. 3 is an illustration about the semiconductor memory apparatus 10 according to the embodiment of the present invention, showing the transfer process from a page buffer 2 to the flash memory 1 that a memory controller 6 performs for the data objects DN8–DN12 to be written, which are transferred from a host H to the page buffer 2.
Figure 4:
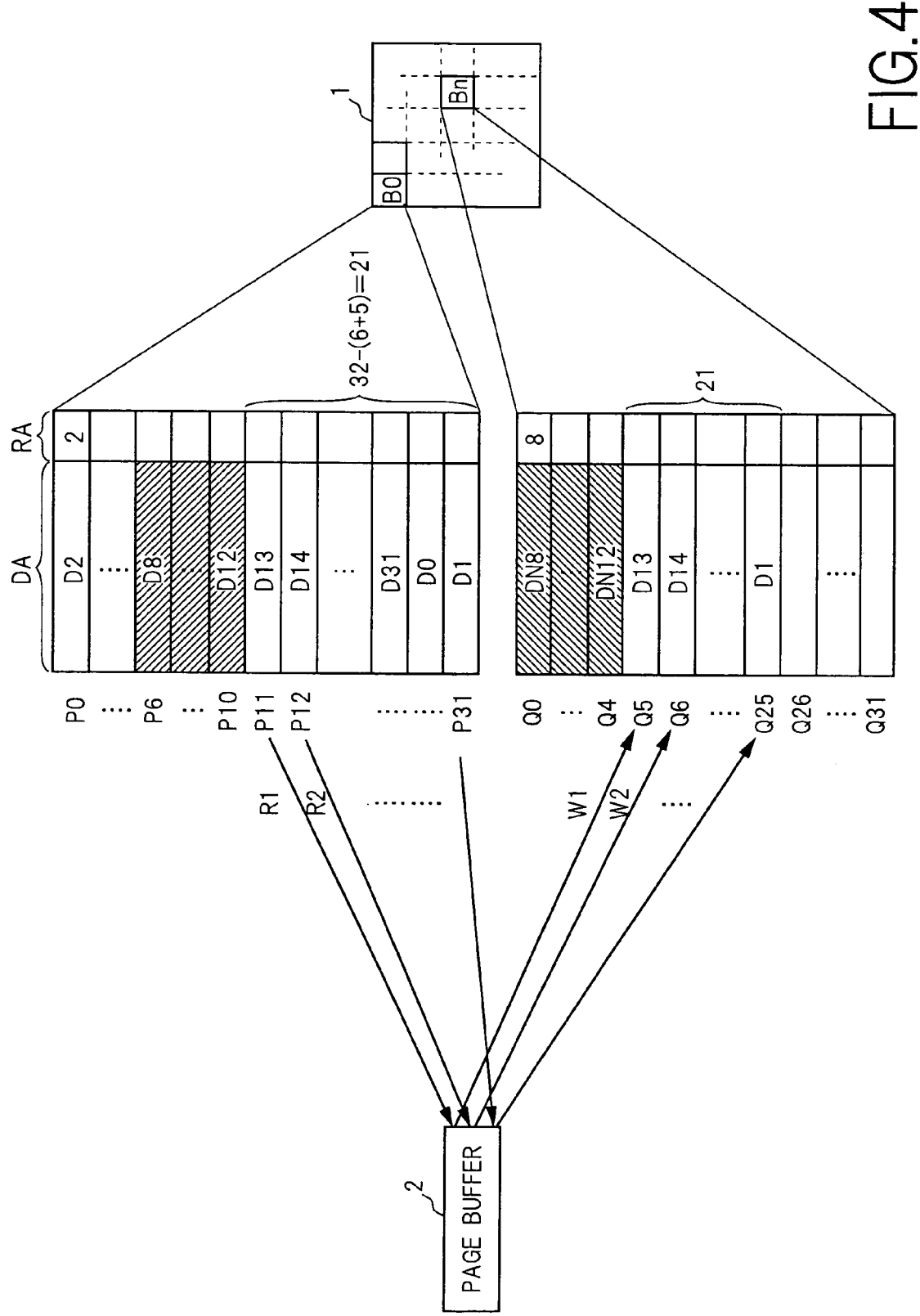
FIG. 4 is an illustration about the semiconductor memory apparatus 10 according to the embodiment of the present invention, showing the first half of the data transfer process from a source block B0 to a destination block Bn that the memory controller 6 performs following the data transfer process shown in FIG. 3.
Figure 5:
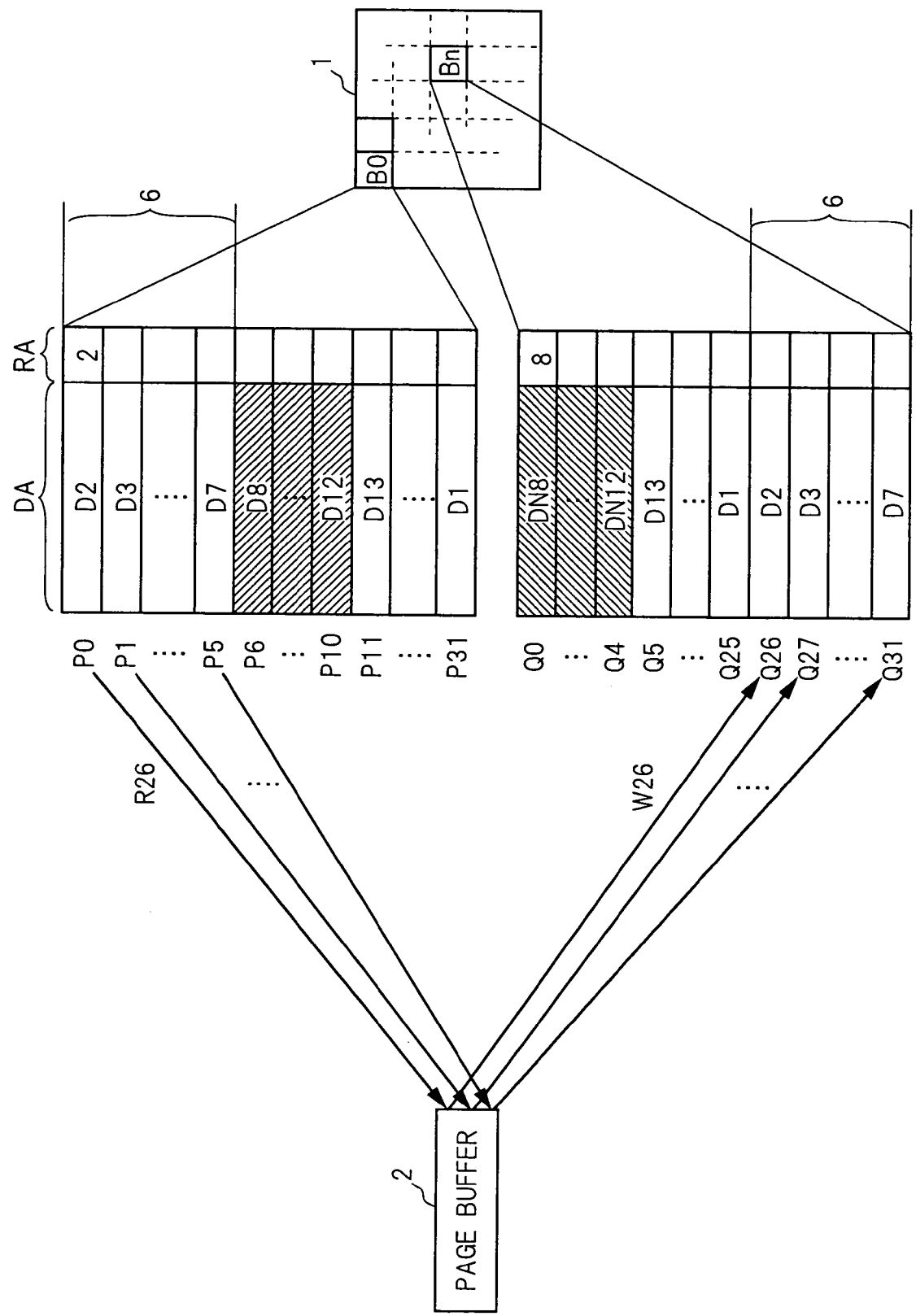
FIG. 5 is an illustration about the semiconductor memory apparatus 10 according to the embodiment of the present invention, showing the second half of the data transfer process from the source block B0 to the destination block Bn that the memory controller 6 performs following the data transfer process shown in FIG. 3.

At the receipt of a write command from the host H, the memory controller 6 performs data writing into the flash memory 1, that is, a renewal or an addition of pages in one block of the flash memory 1 as follows: FIGS. 3–5 are illustrations for demonstrating a method of writing data by the memory controller 6. FIG. 3 shows a transfer process from the page buffer 2 to the flash memory 1, which the memory controller 6 performs for the data objects DN8–DN12 to be written (numerical values beside the reference symbol DN show logical page numbers) that are transferred from the host H to the page buffer 2. Here, let "8" be the logical page number of the write target page indicated by the destination address of the write command. Furthermore, assume that the total amount of the data objects DN8–DN12 is substantially the same as the storage capacity of five pages of the flash memory 1. FIG. 4 and FIG. 5 respectively show the first and second halves of the data transfer process from a source block B0 to a destination block Bn that the memory controller 6 performs following the data transfer process shown in FIG. 3.

The memory controller 6 first receives a physical address from the address conversion section 4. Then, the memory controller 6 identifies a block corresponding to the physical address as a source block in the flash memory 1. In FIGS. 3–5, for example, the head block (the first block) B0 is identified as the source block. The memory controller 6 next reads the page offset "2" of the source block B0 from the redundant area RA of the top page (the first page) P0 of the source block B0. Data items D0, D1, . . . , and D31 (numerical values beside the reference symbol D show logical page numbers of the pages storing the data items) are stored in the data areas DA of the source block B0. In the source block B0, the logical page numbers of the pages P0–P31 (numerical values beside the reference symbol P show the physical page numbers) shift from the physical page numbers by the page offset "2" in a cyclic manner, as shown in FIG. 3. Here, the pages P0, P1, . . . , and P31 may include a page in a state of being erased (or a blank page).

The memory controller 6 further receives the logical page number "8" of the write target page from the address conversion section 4, and determines the difference between the logical page number "8" and the page offset "2" of the source block B0: "8−2=6". Here, the difference generally ranges from −31 to 31 inclusive. When the difference is not negative, the memory controller 6 identifies the difference as the physical page number of the write target page. When the above-described difference is negative, the memory controller 6 adds the total page number (=32) per block to the difference, and identifies the sum as the physical page number of the write target page. Thus, the physical page number of the write target page is determined as an integer between or equal to 0 and 31. In FIGS. 3–5, the seventh page P6 of the source block B0 is identified as the write target page.

The memory controller 6 accesses the address-conversion-table storage section 5 and, based on the flags F stored there, selects one of blank blocks in the flash memory 1 as a destination block. In FIGS. 3–5, for example, the (n+1)th block Bn (n≧1) is selected as the destination block. Any of the 32 pages Q0, Q1, . . . , and Q31 (numerical values beside the reference symbol Q show physical page numbers) in the destination block Bn is blank.

The host interface 3 receives data objects DN8–DN12 to be written that is sent from the host H, and writes the data objects into the page buffer 2 page by page. The memory controller 6 transfers the data objects DN8–DN12 from the page buffer 2 to the destination block Bn page by page (see the arrow shown in FIG. 3.) The data objects DN8–DN12 are written page by page, starting from the top page Q0 of the destination block Bn in sequence. Thereby, the data objects DN8–DN12 are stored in the data areas DA of the top page Q0 through the fifth page Q4 of the destination block Bn (see FIG. 3.) The memory controller 6 further determines the logical page number "8" of the write target page as the page offset of the destination block Bn, and writes the page offset into the redundant area RA of the top page Q0 of the destination block Bn.

Every time when transferring the data objects DN8–DN12 from the page buffer 2 to the destination block Bn, the memory controller 6 counts the number of times of the transfer. The host H notifies the semiconductor memory apparatus 10 of the end of sending of data objects to be written, using a predetermined command. The memory controller 6 detects the command through the host interface 3. At the detection of the command, the memory controller 6 determines the number of pages, "5", of the storage region Q0–Q4 of the data objects DN8–DN12, based on the above-described number of times of the transfer. Then, the memory controller 6 further starts the data transfer from the source block B0 to the destination block Bn. Here, the host H may provide the semiconductor memory apparatus 10 with prior notification of the page number "5" required for the storage of the data objects DN8–DN12. In that case, when the above-described number of times of the transfer reaches the notified page number "5", the memory controller 6 starts the data transfer from the source block B0 to the destination block Bn.

Before the start of a data transfer from the source block B0 to the destination block Bn (which is hereafter referred to as a block transfer), the page buffer 2 is freed. The memory controller 6, using the page buffer 2, performs the block transfer as follows (see FIG. 4 and FIG. 5): First, the fifth page (the 12th page) P11 counted from the write target page (the seventh page) P6 of the source block B0 is identified as the start page of the block transfer (which is hereafter referred to as a transfer start page) (see FIG. 4.) Next, data items D13, . . . , D31, D0, and D1 on the transfer start page P11 through the final page (the 32nd page) P31 are transferred to the destination block Bn as follows (see FIG. 4): First, the data item D13 on the transfer start page P11 is read into the page buffer 2 (see the arrow R1 shown in FIG. 4.) Furthermore, the data item D13 in the page buffer 2 is written onto the sixth page Q5 of the destination block Bn (see the arrow W1 shown in FIG. 4.) Next, the data item D14 on the 13th page P12 of the source block B0 is read into the page buffer 2 (see the arrow R2 shown in FIG. 4.) Furthermore, the data item D14 in the page buffer 2 is written onto the seventh page Q6 of the destination block Bn (see the arrow W2 shown in FIG. 4.) The above-described data transfer via the page buffer 2 is repeated 32−(6+5)=21 times. As a result, the data items D13, D14, . . . , D31, D0, and D1 on the 12th page P11 through the final page P31 of the source block B0 are transferred to the data areas DA of the sixth page Q5 through the 26th page Q25 of the destination block Bn.

The memory controller 6 next transfers data items D2, D3, . . . , and D7 of the top page P0 through the page (the sixth page) P5 just before the write target page P6 of the source block B0 to the destination block Bn as follows (see FIG. 5): First, the data item D2 on the top page P0 of the source block B0 is read into the page buffer 2 (see the arrow R26 shown in FIG. 5.) Furthermore, the data item D2 is written from the page buffer 2 onto the 27th page Q26 of the destination block Bn. Next, the data item D3) on the second page P1 of the source block B0 is similarly transferred via the page buffer 2 to the 28th page Q27 of the destination block Bn. The above-described data transfer via the page buffer 2 is repeated six times. As a result, the data items D2, D3, . . . , and D7 on the top page P0 through the page (the sixth page) P5 just before the write target page P6 of the source block B0 are transferred to the data areas DA of the 27th page Q26 through the final page Q31 of the destination block Bn.

The physical page number of the transfer start page is equal to the sum of the physical page number of the write target page and the number of pages of the storage region of the data objects to be written. Here, when the sum is the total page number (=32) per block or more, the value of the sum minus the total page number is identified as the physical page number of the transfer start page. In that case, the memory controller 6 transfers the data items on the transfer start page through the page just before the write target page to the destination block Bn in a manner similar to the data transfers shown in FIG. 5.

As a result of the above-described data transfers by the memory controller 6, the data items D8–D12 on the pages having the logical page numbers "8" through "12" are replaced with the new data items DN8–DN12 in the destination block Bn, in contrast to the source block B0 (see FIG. 5.) Furthermore, the logical page order changes in a cyclic manner, and the page offset changes from "2" to "8".

At the completion of the block transfer, the memory controller 6 disables or collectively erases data items in the source block B0. At that time, the address conversion section 4 updates the logical/physical address conversion table L, and brings the logical address corresponding to the physical address of the source block B0 into correspondence with the physical-address of the destination block Bn. The address conversion section 4 further resets the flag F stored in the address-conversion-table storage section 5 to show that the source block B0 is a blank block. Thus, the renewal and addition of pages in one block of the flash memory 1 are realized.

The memory controller 6 performs the data writing from the page buffer 2 into the destination block Bn, starting from the top page Q0 of the destination block Bn and finishing at the final page Q31 as described above. This writing order is the same as that of conventional apparatuses. Accordingly, the same configuration as that of the conventional apparatuses may be used for the data writing from the page buffer into the destination block.

Figure 6:
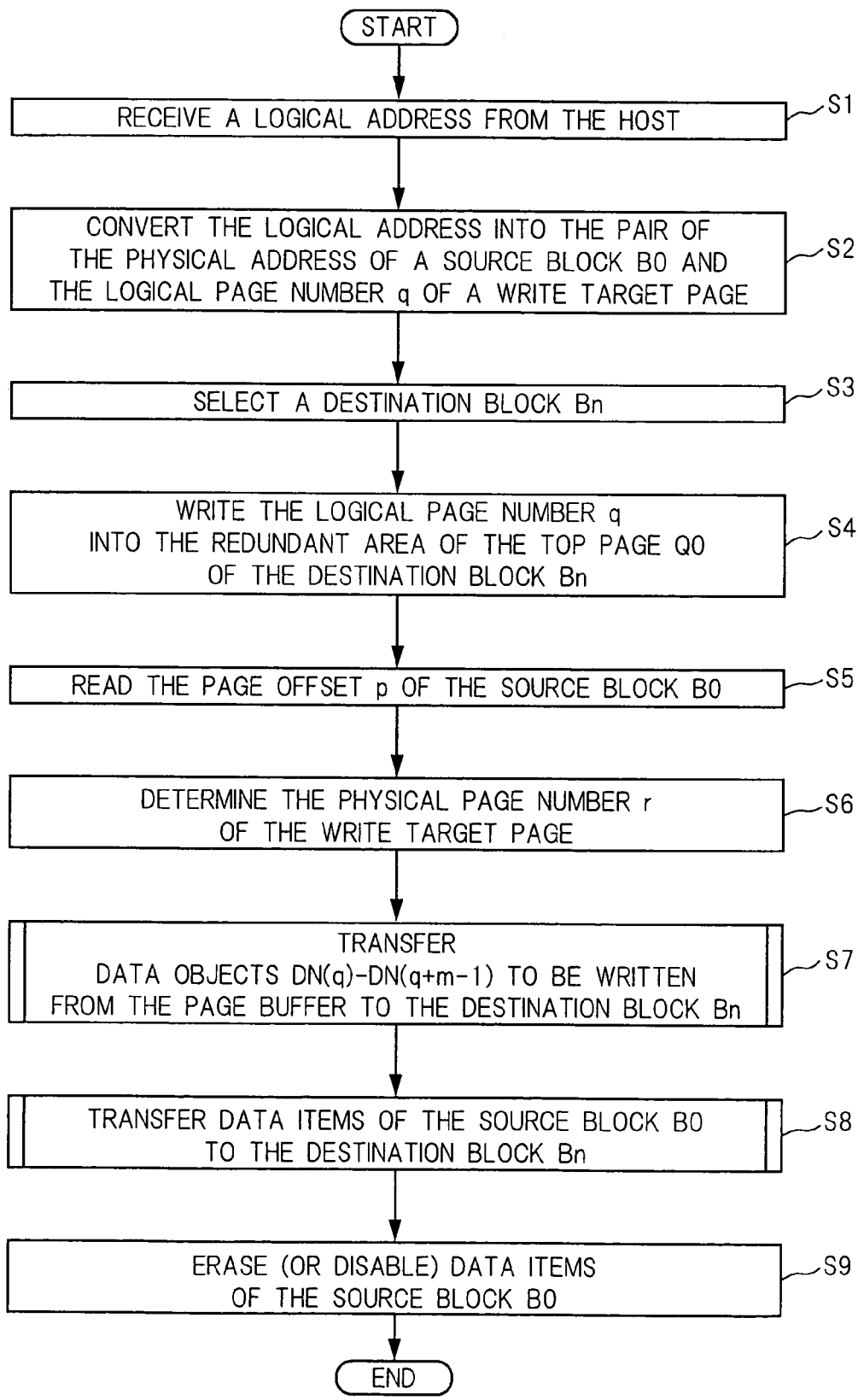
FIG. 6 is a flow chart of the method of writing data by the semiconductor memory apparatus 10 according to the embodiment of the present invention.

The method of writing data by the semiconductor memory apparatus 10 according to the embodiment is performed as shown by the following flow: FIG. 6 is the flow chart of the method of writing data by the semiconductor memory apparatus 10.

<Step S1>

A data write command is sent out from the host H. The host interface 3 receives the data write command and decodes it into the logical address of a write target page. The host interface 3 further sends the logical address to the address conversion section 4.

<Step S2>

The address conversion section 4 receives the logical address from the host interface 3. The address conversion section 4 then consults the logical/physical address conversion table L and converts the logical address into the pair of the physical address of the source block B0 and the logical page number q ($0 \leq q \leq 31$) of the write target page. The address conversion section 4 further sends the pair to the memory controller 6.

<Step S3>

The memory controller 6 accesses the address-conversion-table storage section 5 and selects one of blank blocks, Bn in the flash memory 1 as a destination block, based on the flags F. Here, when the source block B0 is a blank block, the source block B0 itself may be selected as the destination block Bn. In that case, the following steps S8 and S9 are skipped.

<Step S4>

The memory controller 6 writes the logical page number q received from the address conversion section 4 into the redundant area RA of the top page Q0 of the destination block Bn (see FIG. 3.)

<Step S5>

The memory controller 6 reads the page offset p ($0 \leq p \leq 31$) of the source block B0 from the redundant area RA of the top page P0 of the source block B0.

<Step S6>

The memory controller 6 determines the difference between the logical page number q of the write target page and the page offset p of the source block B0. When the difference q−p is negative (q−p<0), the controller adds the total page number (=32) per block to the difference q−p. A thus derived integer value between or equal to 0 and 31, q−p or 32+q−p, is identified as the physical page number r of the write target page: r=q−p or r=32+q−p.

<Step S7>

Figure 7:
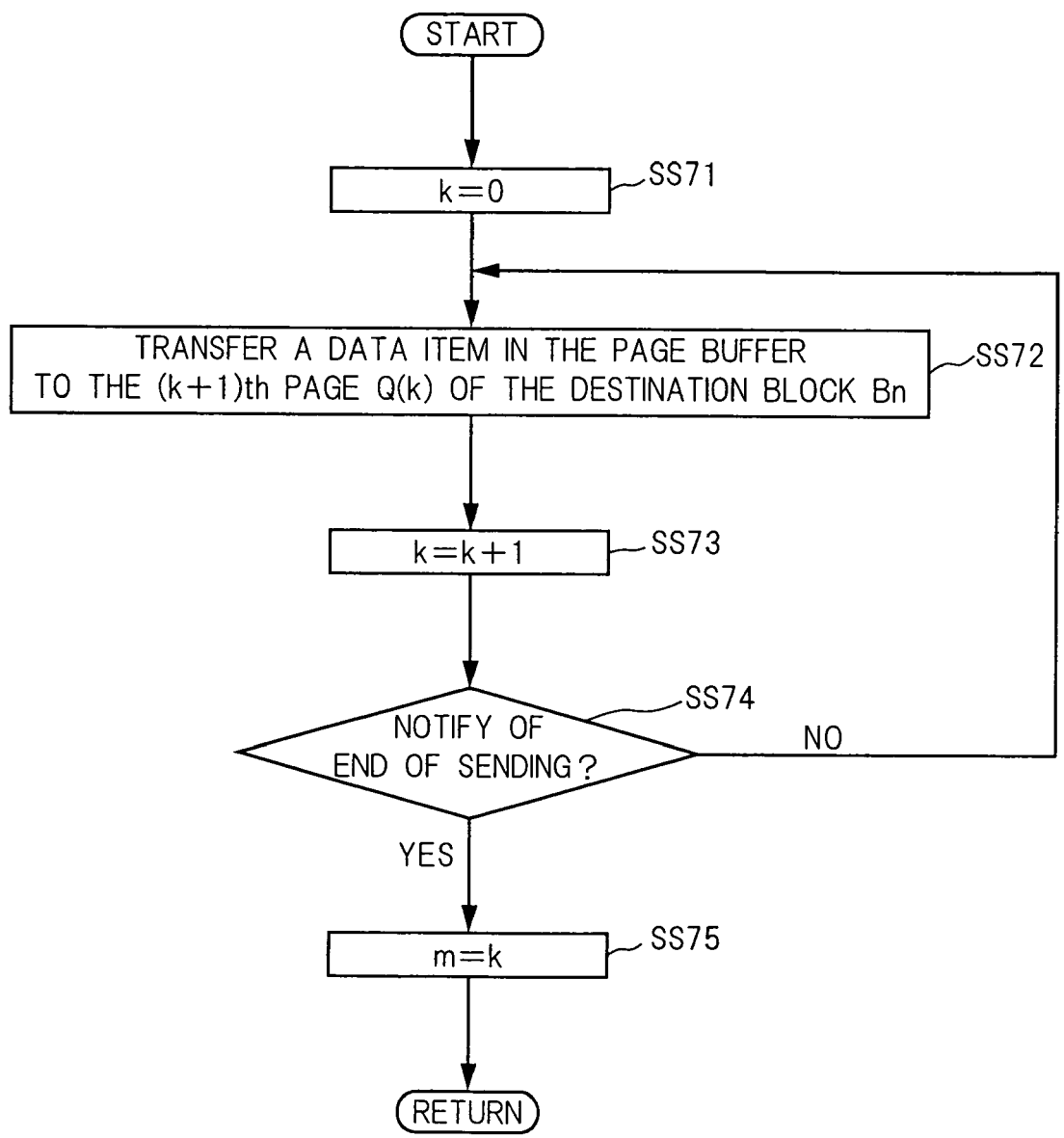
FIG. 7 is a flow chart of transfers of the data objects DN(q)–DN(q+m−1) to be written from the page buffer 2 to the destination block Bn (Step 7), about the method of writing data by the semiconductor memory apparatus 10 according to the embodiment of the present invention.

The host interface 3 receives data objects DN(q), DN(q+1), . . . to be written from the host H (reference symbols in parentheses beside the reference symbol DN show logical page numbers.) The host interface 3 transfers the data objects DN(q), DN(q+1), . . . to the page buffer 2 page by page. The host interface 3 further notifies the memory controller 6 of the transfer. The memory controller 6 transfers the data objects DN(q), DN(q+1), . . . in the page buffer 2 every notification from the host interface 3, starting from the top page Q0 of the destination block Bn in sequence. FIG. 7 is the flow chart of the transfers.

Substep SS71: The memory controller 6 initializes a first integer variable k in 0, when receiving the first notification of the above-described transfer from the host interface 3.

Substep SS72: The memory controller 6 transfers a data item in the page buffer 2 to the data area DA of the (k+1)th page Q(k) of the destination block Bn (reference symbol in parentheses beside the reference symbol Q shows the physical page number) (see FIG. 3.)

Substep SS73: The memory controller 6 increments the first integer variable k by one. Thus, the first integer variable k indicates a number of times of the transfer of the data objects DN(q), DN(q+1), . . . from the page buffer 2 to the destination block Bn.

Substep SS74: When finishing the sending of the data objects DN(q)–DN(q+m−1), the host H issues a predetermined command showing the end of the sending. The host interface 3 detects the command. The memory controller 6 accesses the host interface 3 and checks whether or not to detect the command. When the command is not yet detected, the process is repeated from Substep SS72. When the command is detected, the process proceeds to Substep SS75.

Substep SS75: When detecting the command, the memory controller 6 identifies the first integer variable k as the number of pages, m ($1 \leq m \leq 32-q$), of the storage region Q0–Q(m−1) of the data objects DN(q)–DN(q+m−1).

<Step S8>

Figure 8:
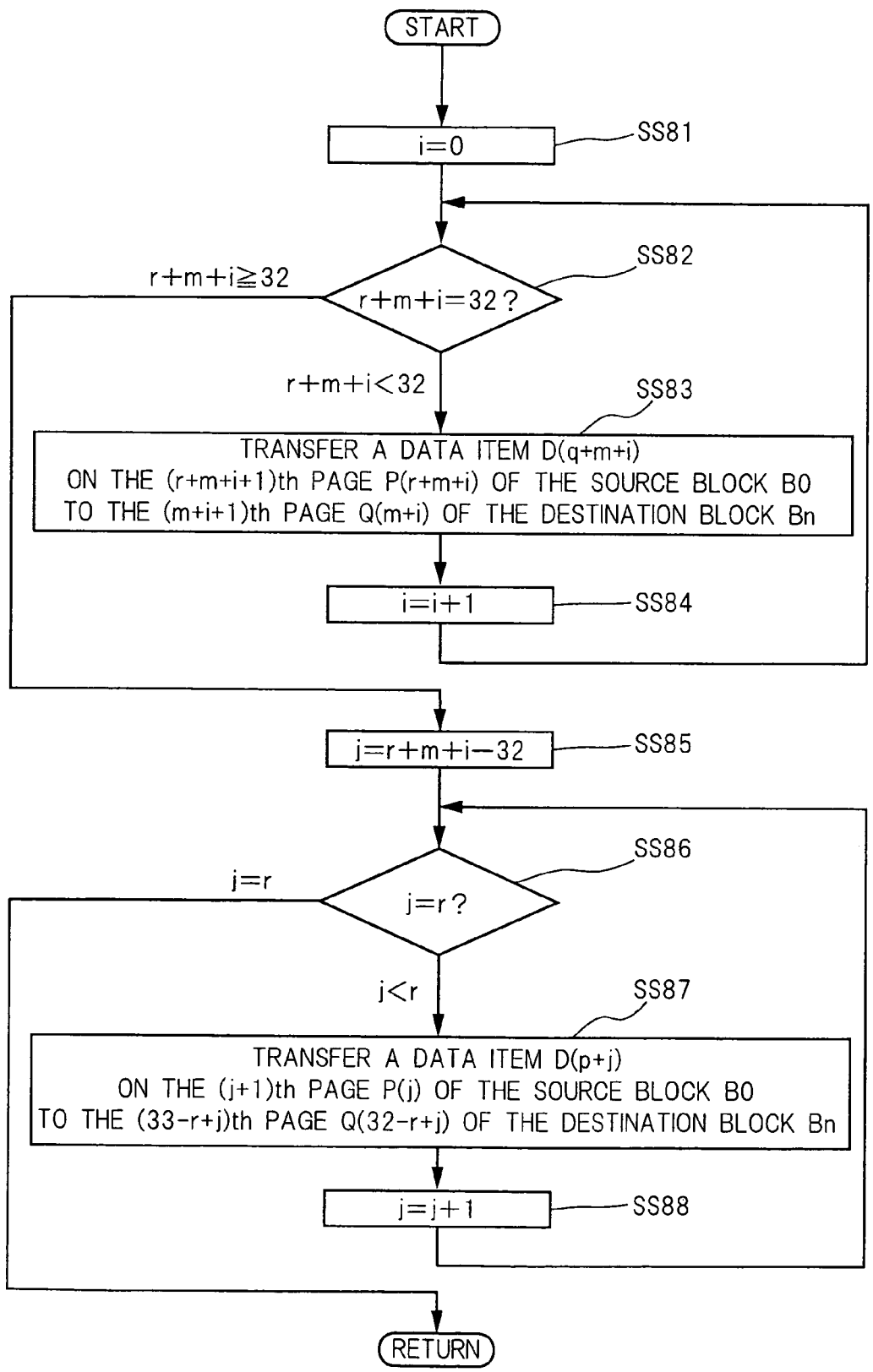
FIG. 8 is a flow chart of data transfers from the source block B0 to the destination block Bn (Step S8), about the method of writing data by the semiconductor memory apparatus 10 according to the embodiment of the present invention.
Figure 9:
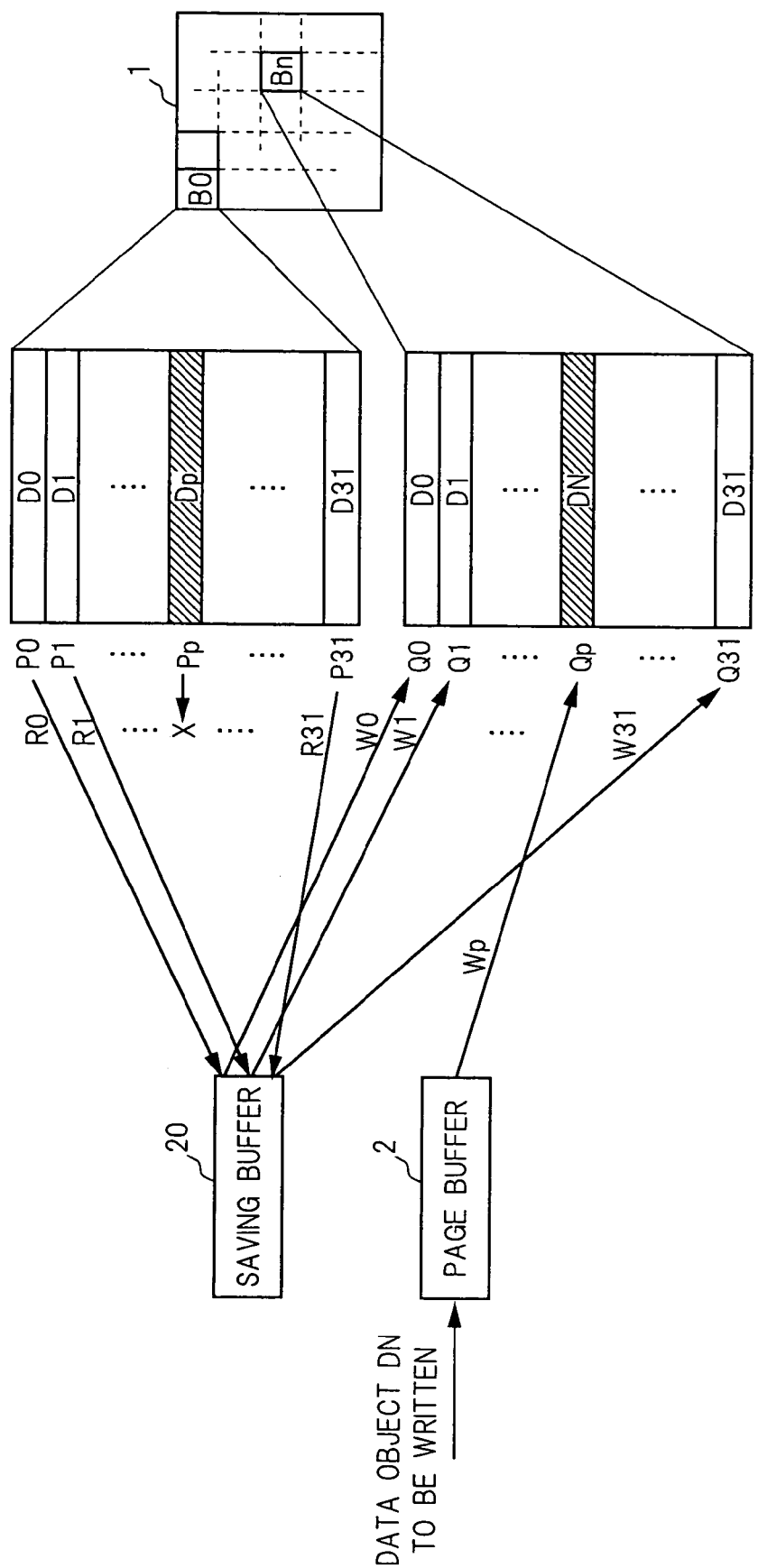
FIG. 9 is an illustration for demonstrating a renewal or an addition of pages in one block of the flash memory 1 by a conventional semiconductor-memory apparatus.

The memory controller 6 starts a data transfer from the source block B0 to the destination block Bn (a block transfer). FIG. 8 is the flow chart of the block transfer.

Substep SS81: The memory controller 6 initializes a second integer variable i in 0.

Substep SS82: The memory controller 6 sums up the physical page number r of the write target page (see Step S6), the number of pages m of the storage region Q0–Q(m−1) of the data objects DN(q)–DN(q+m−1), and the second integer variable i. When the sum r+m+i is less than 32 (r+m+i<32), the process proceeds to Substep SS83. When the sum r+m+i is 32 or more (r+m+i$\geq$32), the process branches to Substep SS85.

Substep SS83: The memory controller 6 transfers via the page buffer 2 the data item D(q+m+i) stored on the (r+m+i+1)th page P(r+m+i) of the source block B0 to the (m+i+1)th page Q(m+i) of the destination block Bn (see FIG. 4.) Here, reference symbols in parentheses beside the reference symbols P and D show the physical and logical page numbers, respectively.

Substep SS84: The memory controller 6 increments the second integer variable i by one. Then, the process is repeated from Substep SS82.

Substep SS83 is repeated for-each value of the second integer variable i=0, 1, 2, . . . , and 31−(r+m), because of the loop of Substeps SS82–SS84. As a result, the data items D(q+m), D(q+m+1), . . . , and D(p−1) of the (r+m+1)th page P(r+m) through the 32nd page (the final page) P31 of the source block B0 are transferred to the data areas DA of the (m+1)th page Qm through the (32−r)th page Q(31−r) of the destination block Bn (see FIG. 4.)

Substep SS85: The memory controller 6 sets the initial value of a third integer variable j to be equal to the value r+m+i minus 32: j=r+m+i−32. Here, when r+m<32, the initial value of the third integer variable j is equal to 0. When r+m≧32, the initial value of the third integer variable j is r+m−32=q+m−p, which is equal to 0 or more.

Substep SS86: The memory controller 6 compares the third integer variable j with the physical page number r of the write target page. When the third integer variable j is less than the physical page number r of the write target page (j<r), the process proceeds to Substep SS87. When the third integer variable j is equal to the physical page number r of the write target page (j=r), the process branches to Step S9.

Substep SS87: The memory controller 6 transfers via the page buffer 2 the data item D(p+j) on the (j+1)th page P(j) of the source block B0 to the (33−r+j)th page Q(32−r+j) of the destination block Bn (see FIG. 5.)

Substep SS88: The memory controller 6 increments the third integer variables j by one. Then, the process is repeated from Substep SS86.

Substep SS87 is repeated for each value of the integer variable j=0, 1, 2, . . . , r−1, or j=q+m−p, . . . , p−1, because of the loop of Substeps SS86–SS88. As a result, the data items D(p), . . . , and D(q−1) of the first page P0 through the rth page P(r−1) of the source block B0 are transferred to the data areas DA of the (33−r)th page Q(32−r) through the 32nd page (the final page) Q31 of the destination block Bn (see FIG. 5.) Alternatively, the data items D(q+m), . . . , D31, D0, . . . , and D(q−1) of the (q+m−p+1)th page P(q+m−p) through the rth page P(r−1) of the source block B0 are transferred to the data areas DA of the (m+1)th page Qm through the 32nd page (the final page) Q31 of the destination block Bn.

<Step S9>

The memory controller 6 collectively erases or disables data items in the source block B0. The address conversion section 4 then updates the logical/physical address conversion table L, and brings the logical address corresponding to the physical address of the source block B0 into correspondence with the physical address of the destination block Bn. The address conversion section 4 further resets the flag F stored in the address-conversion-table storage section 5 to show that the source block B0 is a blank block.

As described above, at the renewal and the addition of pages in one block of the flash memory 1, the semiconductor memory apparatus 10 according to the embodiment uses the page buffer 2 as a saving space of the data items in the original block, thereby including no saving buffer apart from the page buffer 2, in contrast to conventional apparatuses. As a result, the semiconductor memory apparatus has RAMs smaller in size than those of the conventional apparatuses. Therefore, a small size of the whole apparatus can be maintained.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

INDUSTRIAL APPLICABILITY

The semiconductor memory apparatus according to the present invention realizes miniaturization through the integration of page buffer and saving buffer. Therefore, the present invention has extremely high industrial applicability.

The invention claimed is:

1. A semiconductor memory apparatus comprising:
(A) a flash memory device comprising more than one block, each of which includes more than one page, and a page-offset storage area in which a page offset of each of said blocks is stored, and configured to write data into a blank block from its top page in sequence;
(B) a page buffer in which the substantially same amount of data as the data storage capacity of one of said pages is temporarily stored;
(C) an address conversion section for receiving from a host a logical address that specifies a write target page, and converting the logical address into a pair of a physical address of a source block to which said write target page belongs, and a logical page number of said write target page; and
(D) a memory control section for
   (a) reading the physical address of said source block and the logical page number of said write target page,
   (b) selecting the blank block as a destination block,
   (c) determining a page offset of said destination block based on the logical page number of said write target page, and writing the page offset into said page-offset storage area as the page offset of said destination block,
   (d) reading a page offset of said source block from said page-offset storage area,
   (e) obtaining a physical page number of said write target page based on the page offset of said source block and the logical page number of said write target page,
   (f) writing a data object to be written, which is transferred from said host to said page buffer, into said destination block from its top page in sequence,
   (g) obtaining a physical page number of a transfer start page of said source block based on the number of pages of said data objects and the physical page number of said write target page, and
   (h) transferring data stored in said source block, from said transfer start page in a sequential and cyclic manner, via said page buffer, to a page next to or after a page area of said destination block into which said data object is written.

2. A semiconductor memory apparatus according to claim 1, wherein:
(A) said semiconductor memory apparatus further comprising:
   (a) a host interface for receiving the logical address of said write target page and said data object, which are sent out from said host; and
   (b) an address-conversion-table storage section storing a logical/physical address conversion table showing a correspondence between a logical address and a physical address for each of said blocks in said flash memory device, and a flag for showing whether or not each of said blocks is said blank block; and (B) said memory control section counts the number of pages of said page area, and starts data transmission from said source block to said destination block in one of the case when the number of the pages reaches a predetermined number and the case when said host provides notification of the end of sending of said data object.

3. A semiconductor memory apparatus comprising:
(A) a flash memory device comprising more than one block, each of which includes more than one page, and configured to write data into a blank block from its top page in sequence;
(B) a page-offset storage section for storing a page offset of each of said blocks;
(C) a page buffer in which the substantially same amount of data as the data storage capacity of one of said pages is temporarily stored;
(D) an address conversion section for receiving from a host a logical address that specifies a write target page, and converting the logical address into a pair of a physical address of a source block and a logical page number of said write target page; and
(E) a memory control section for
  (a) reading the physical address of said source block and the logical page number of said write target page,
  (b) selecting the blank block as a destination block,
  (c) determining a page offset of said destination block based on the logical page number of said write target page, and writing the page offset into said page-offset storage section as the page offset of said destination block,
  (d) reading a page offset of said source block from said page-offset storage section,
  (e) obtaining a physical page number of said write target page based on the page offset of said source block and the logical page number of said write target page,
  (f) writing a data object to be written, which is transferred from said host to said page buffer, into said destination block from its top page in sequence,
  (g) obtaining a physical page number of a transfer start page of said source block based on the number of pages of said data objects and the physical page number of said write target page, and
  (h) transferring data stored in said source block, from said transfer start page in a sequential and cyclic manner, via said page buffer, to a page next to or after a page area of said destination block into which said data object is written.

4. A semiconductor memory apparatus according to claim 3, wherein:
(A) said semiconductor memory apparatus further comprising:
  (a) a host interface for receiving the logical address of said write target page and said data object, which are sent out from said host; and
  (b) an address-conversion-table storage section storing a logical/physical address conversion table showing a correspondence between a logical address and a physical address for each of said blocks in said flash memory device, and a flag for showing whether or not each of said blocks is said blank block; and
(B) said memory control section counts the number of pages of said page area, and starts data transmission from said source block to said destination block in one of the case when the number of the pages reaches a predetermined number and the case when said host provides notification of the end of sending of said data object.

5. A method of writing data into a flash memory device, which is the method of writing data into a flash memory device comprising more than one block, each of which includes more than one page, and writing data into a blank block from its top page in sequence;
the method comprising the steps of:
(A) receiving from a host a logical address specifying a write target page;
(B) converting said logical address into a pair of a physical address of a source block and a logical page number of said write target page;
(C) selecting the blank block as a destination block;
(D) determining a page offset of said destination block based on the logical page number of said write target page, and writing the page offset into a page-offset storage area in said flash memory device as a page offset of said destination block;
(E) reading a page offset of said source block from said page-offset storage area;
(F) determining a physical page number of said write target page based on the page offset of said source block and the logical page number of said write target page;
(G) writing a data object to be written, which is transferred from said host to a page buffer, into said destination block from its top page in sequence; and
(H) obtaining a physical page number of a transfer start page of said source block based on the number of pages of said data objects and the physical page number of said write target page, and transferring data stored in said source block, from said transfer start page in a sequential and cyclic manner, via said page buffer, to a page next to or after a page area of said destination block into which said data object is written.

6. A method of writing data into a flash memory device according to claim 5, further comprising the step of counting the number of pages of said page area, and starting data transmission from said source block to said destination block in one of the case when the number of the pages reaches a predetermined number and the case when said host provides notification of the end of sending of said data object.

7. A method of writing data into a flash memory device, which is the method of writing data into a flash memory device comprising more than one block, each of which includes more than one page, and writing data into a blank block from its top page in sequence;
the method comprising the steps of:
(A) receiving from a host a logical address specifying a write target page;
(B) converting said logical address into a pair of a physical address of a source block and a logical page number of said write target page;
(C) selecting the blank block as a destination block;
(D) determining a page offset of said destination block based on the logical page number of said write target page, and writing the page offset into a page-offset storage section as a page offset of said destination block;
(E) reading a page offset of said source block from said page-offset storage section;

(F) determining a physical page number of said write target page based on the page offset of said source block and the logical page number of said write target page;
(G) writing a data object to be written, which is transferred from said host to a page buffer, into said destination block from its top page in sequence; and
(H) obtaining a physical page number of a transfer start page of said source block based on the number of pages of said data objects and the physical page number of said write target page, and transferring data stored in said source block, from said transfer start page in a sequential and cyclic manner, via said page buffer, to a page next to or after a page area of said destination block into which said data object is written.

8. A method of writing data into a flash memory device according to claim 7, further comprising the step of counting the number of pages of said page area, and starting data transmission from said source block to said destination block in one of the case when the number of the pages reaches a predetermined number and the case when said host provides notification of the end of sending of said data object.

* * * * *

UNITED STATES PATENT AND TRADEMARK OFFICE
CERTIFICATE OF CORRECTION

| | | |
|---|---|---|
| PATENT NO. | : 7,107,389 B2 | Page 1 of 1 |
| APPLICATION NO. | : 10/486960 | |
| DATED | : September 12, 2006 | |
| INVENTOR(S) | : Yoshihisa Inagaki et al. | |

It is certified that error appears in the above-identified patent and that said Letters Patent is hereby corrected as shown below:

<u>Title Page, Item (54)</u>:

The title should read -- Semiconductor Memory Apparatus and Method for Writing Data into the Flash Memory Device --.

Signed and Sealed this

Twenty-seventh Day of March, 2007

JON W. DUDAS
*Director of the United States Patent and Trademark Office*